US00RE50826E

(19) United States
(12) Reissued Patent
Fox

(10) Patent Number: US RE50,826 E
(45) **Date of Reissued Patent: *Mar. 17, 2026**

(54) ANCHOR DEVICE FOR A WOODEN POST

(71) Applicant: Fox Hardwood Lumber Company, L.L.C., Franklin, TN (US)

(72) Inventor: Tommy Fox, Franklin, TN (US)

( * ) Notice: This patent is subject to a terminal disclaimer.

(21) Appl. No.: 18/221,064

(22) Filed: Jul. 12, 2023

Related U.S. Patent Documents

Reissue of:
(64) Patent No.: 11,555,325
Issued: Jan. 17, 2023
Appl. No.: 17/220,862
Filed: Apr. 1, 2021

U.S. Applications:
(63) Continuation of application No. 16/821,091, filed on Mar. 17, 2020, now Pat. No. 10,968,655, which is a continuation of application No. 16/398,134, filed on Apr. 29, 2019, now Pat. No. 10,597,892, which is a continuation of application No. 16/105,932, filed on Aug. 20, 2018, now Pat. No. 10,273,707, which is a continuation of application No. 15/934,081, filed on Mar. 23, 2018, now Pat. No. 10,060,150, which is a continuation of application No. 14/489,839, filed on Sep. 18, 2014, now Pat. No. 9,938,745, which is a continuation of application No. 13/644,475, filed on Oct. 4, 2012, now Pat. No. 8,864,096.

(51) Int. Cl.
*E04H 12/22* (2006.01)
*E02D 27/42* (2006.01)

(52) U.S. Cl.
CPC ..... *E04H 12/2269* (2013.01); *E02D 27/42* (2013.01); *E04H 12/2292* (2013.01); *E04H 12/2253* (2013.01)

(58) Field of Classification Search
CPC . E04H 12/22; E04H 12/2215; E04H 12/2253; E04H 12/2269; E04H 12/2292; E02D 27/42
USPC ..... 52/169, 298, 698, 704, 715
See application file for complete search history.

(56) References Cited

U.S. PATENT DOCUMENTS

| | | | | |
|---|---|---|---|---|
| 1,791,135 | A * | 2/1931 | Kummer | E04H 12/2253 52/707 |
| 4,924,648 | A * | 5/1990 | Gilb | E04H 12/2253 52/297 |
| 10,060,150 | B1 * | 8/2018 | Fox | E02D 27/42 |
| 10,273,707 | B1 * | 4/2019 | Fox | E02D 27/42 |
| 10,968,655 | B1 * | 4/2021 | Fox | E02D 27/42 |
| 2004/0026679 | A1 * | 2/2004 | Terrels | E04H 17/1439 256/65.03 |
| 2007/0267552 | A1 * | 11/2007 | Meyer | E04H 12/2276 248/156 |

* cited by examiner

*Primary Examiner* — Sarah B Mcpartlin
(74) *Attorney, Agent, or Firm* — Shane Cortesi

(57) ABSTRACT

An anchoring device for supporting a post from a support surface. The anchoring device comprises a base, at least one stanchion extending from the base, and a plate attached to the stanchion opposite the base. A plurality of side supports is included with each side support attached to and extending from the base. The side supports are also attached to the plate and extend past the plate. First and second guides are included with each guide attached to the plate and each side support. Each guide extends away from the base.

19 Claims, 9 Drawing Sheets

ANCHOR DEVICE FOR A WOODEN POST

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This is a Non-Provisional Patent Application filed by applicant Tommy Fox for the invention by Tommy Fox, a citizen of the United States, residing at 5973 Pinewood Road, Franklin, Tenn. 37064, of an "Anchor Device for a Wooden Post."

This application is a continuation application claiming priority to U.S. patent application Ser. No. 16/821,091, filed Mar. 17, 2020 and entitled "Anchor Device for a Wooden Fence Post", which is a continuation application claiming priority to U.S. patent application Ser. No. 16/398,134, filed Apr. 29, 2019 and entitled "Anchor Device for a Wooden Post", which is a continuation application claiming priority to U.S. patent application Ser. No. 16/105,932, filed Aug. 20, 2018 and entitled "Anchor Device for a Wooden Post", which is a continuation application claiming priority to U.S. patent application Ser. No. 15/934,081, filed Mar. 23, 2018 and entitled "Anchor Device for a Wooden Post", now U.S. Pat. No. 10,060,150 issued Aug. 28, 2018, which is a continuation application claiming priority to U.S. patent application Ser. No. 14/489,839, filed Sep. 18, 2014, and entitled "Anchor Device for a Wooden Post", now U.S. Pat. No. 9,938,745 issued Apr. 10, 2018, which is a continuation application claiming priority to U.S. patent application Ser. No. 13/644,475, filed Oct. 4, 2012, and entitled "Anchor Device for a Wooden Post", now U.S. Pat. No. 8,864,096 issued Oct. 21, 2014.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND OF THE INVENTION

The present invention relates generally to supports for posts, and more particularly to an anchoring device for supporting a post.

Various devices are known in the art that connect a support post to a surface support structure, such as floor, base, pillar, column, footer, slab, or other general support structure. Some of these prior art anchoring devices, or brackets, have attempted to facilitate the attachment between the support post and the support structure for the construction of a building, such as a dwelling, home, office, barn, and the like. Most of these prior art devices have failed to adequately allow for the installation of those brackets when the support structure comprises a hard material and the post held by those brackets is of a different material. This is especially true for posts that extend upward in a generally vertical direction.

What is needed is a new anchoring device or bracket used for supporting a post. This preferred device facilitates the connection between the post and a support surface where the post and the support surface are made of different materials while allowing for easy installation to the support surface and attachment to the post. This needed anchoring device is lacking in the art.

BRIEF SUMMARY OF THE INVENTION

Included herein is an anchoring device for supporting a post. The anchoring device comprises a base, at least one stanchion extending from the base, and a plate attached to the stanchion opposite the base. A plurality of side supports is included with each side support attached to and extending from the base. The side supports are also attached to the plate and extend past the plate. First and second guides are included with each guide attached to the plate and each side support. Each guide extends away from the base.

The plate, the side supports, the first guide, and the second guide can define a cavity shaped to accept the post within the anchoring device. The base can include a plurality of base openings and the plate can include a plurality of plate openings wherein the plate openings are aligned with the base openings. Each side support can include at least one curved side where that curved side starts proximate the plate. Alternately, that curved side can start proximate either the first or second guide. Two curved sides on each side support are possible. Additionally, each side support can include a plurality of side support openings and each side support can be biased towards one of the other side supports at a location distal from the plate.

It is therefore a general object of the current disclosure to provide an anchoring device for a support post.

Another object of the current disclosure is to provide an anchoring device that facilitates attachment between a post and support surface where the post and the support surface are different materials.

Another object of the present disclosure is to provide an anchoring device that is both functional and aesthetically appealing.

Other and further objects, features and advantages of the present disclosure will be readily apparent to those skilled in the art upon reading of the following disclosure when taken in conjunction with the accompanying drawings.

DETAILED DESCRIPTION OF THE INVENTION

Figure 1:
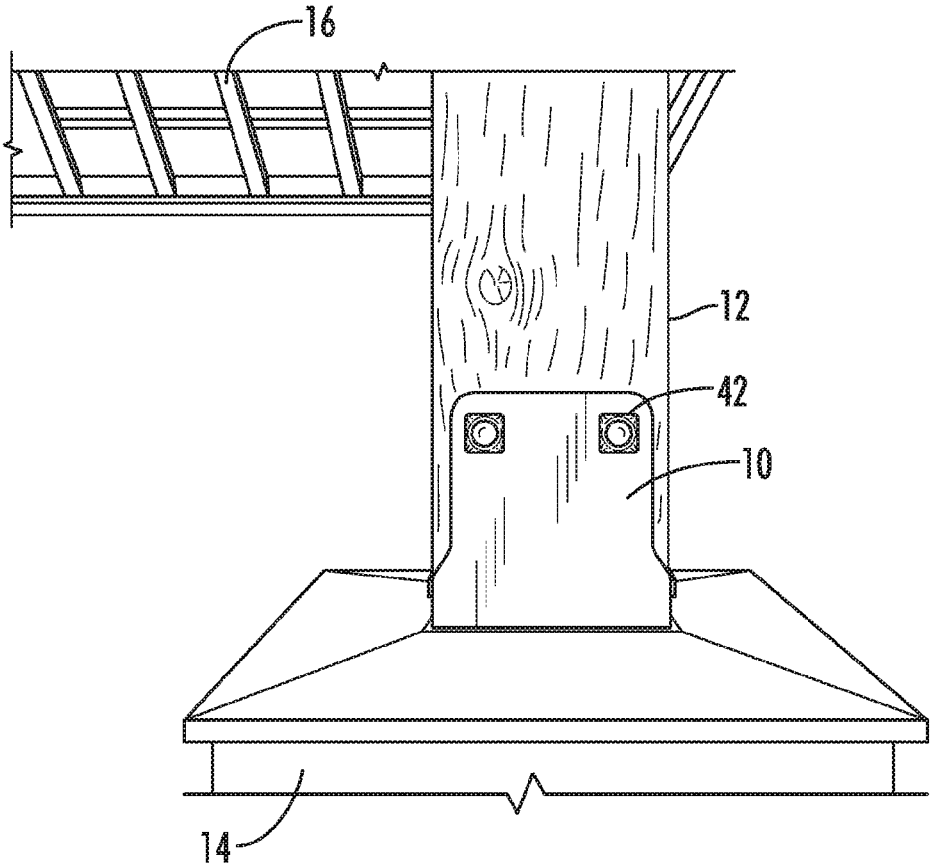
FIG. 1 is a perspective view of an attachment device made in accordance with the current disclosure shown supporting a post and attached to a support surface.
Figure 2:
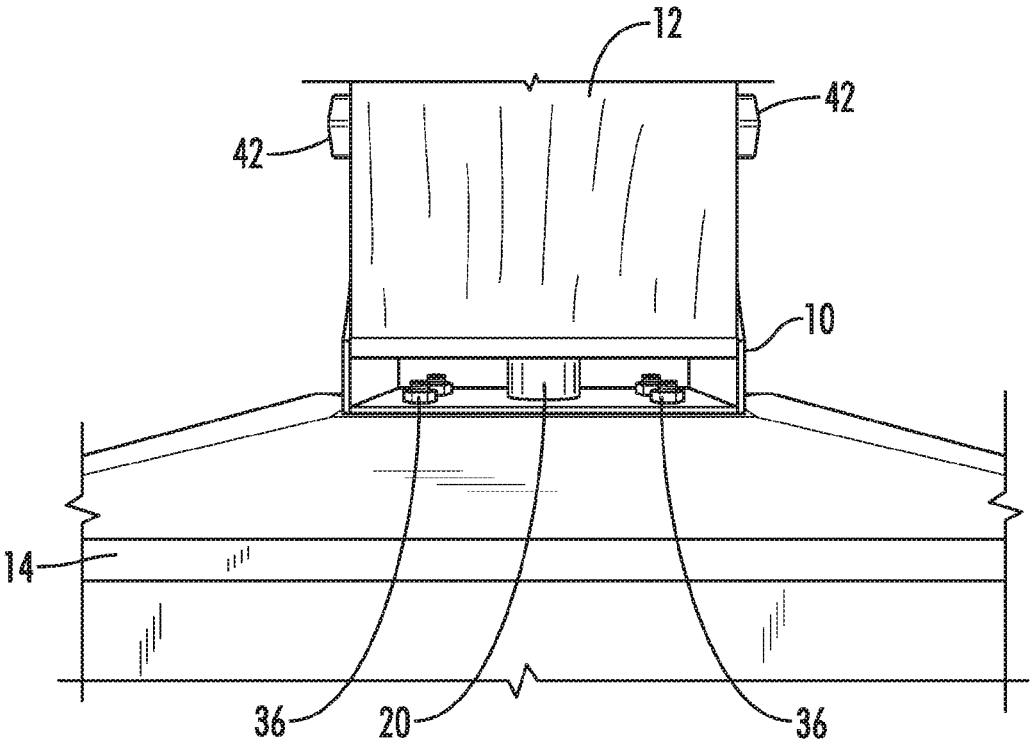
FIG. 2 is an image similar to FIG. 1.
Figure 3:
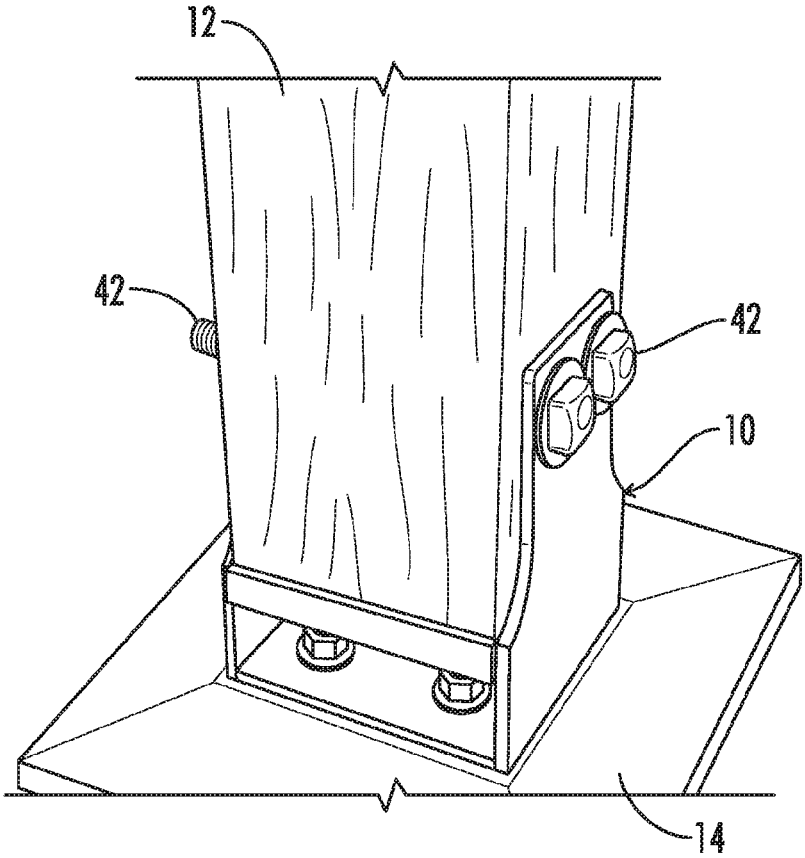
FIG. 3 is an image similar to FIGS. 1-2.
Figure 4:
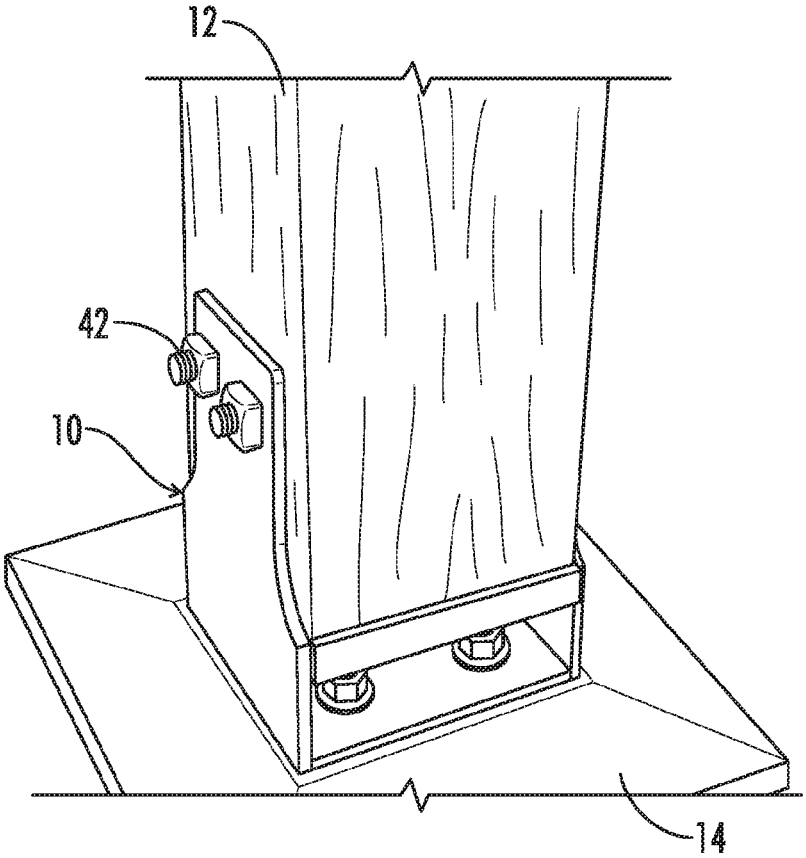
FIG. 4 is an image similar to FIGS. 1-3.
Figure 5:
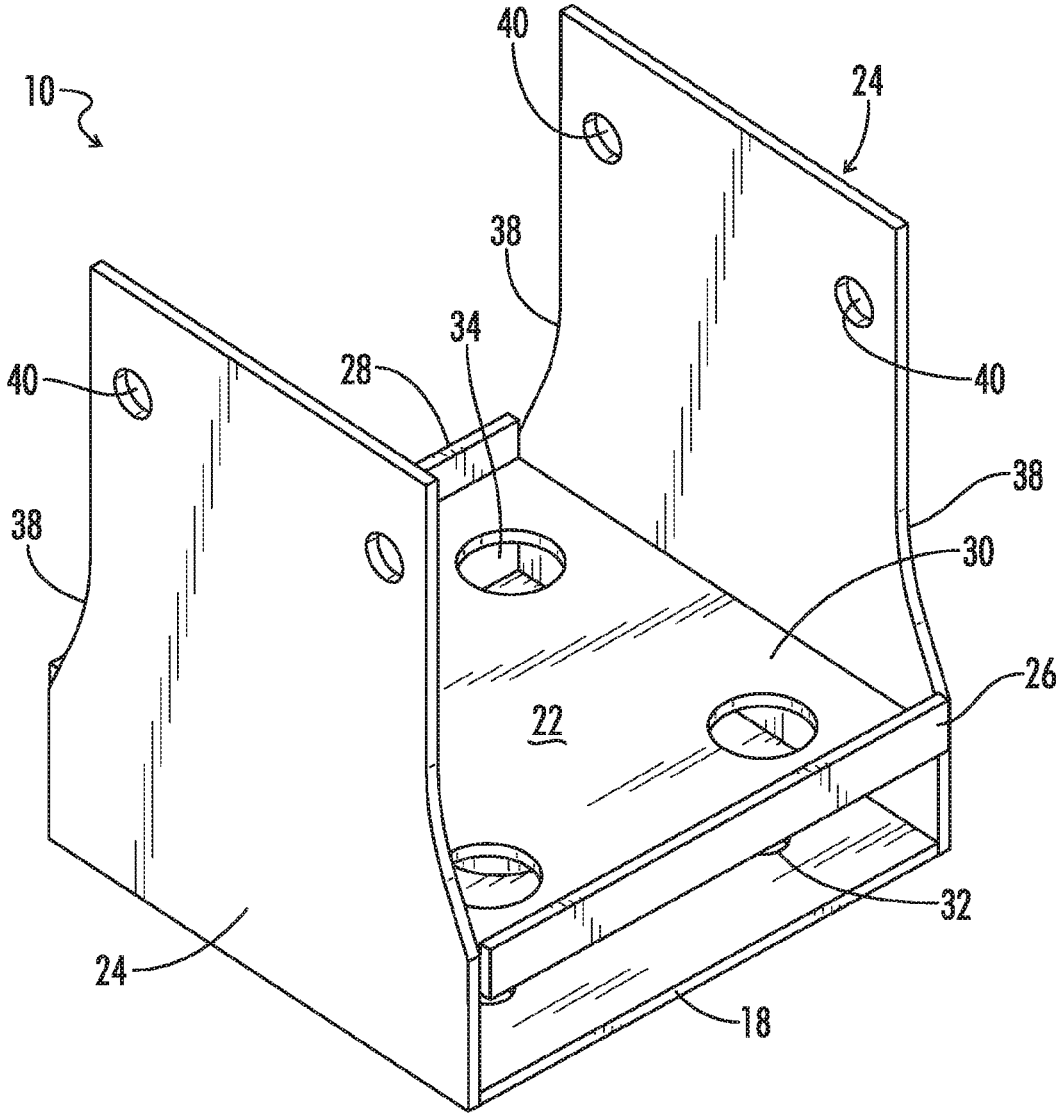
FIG. 5 is a perspective view of an attachment device made in accordance with the current disclosure.
Figure 6:
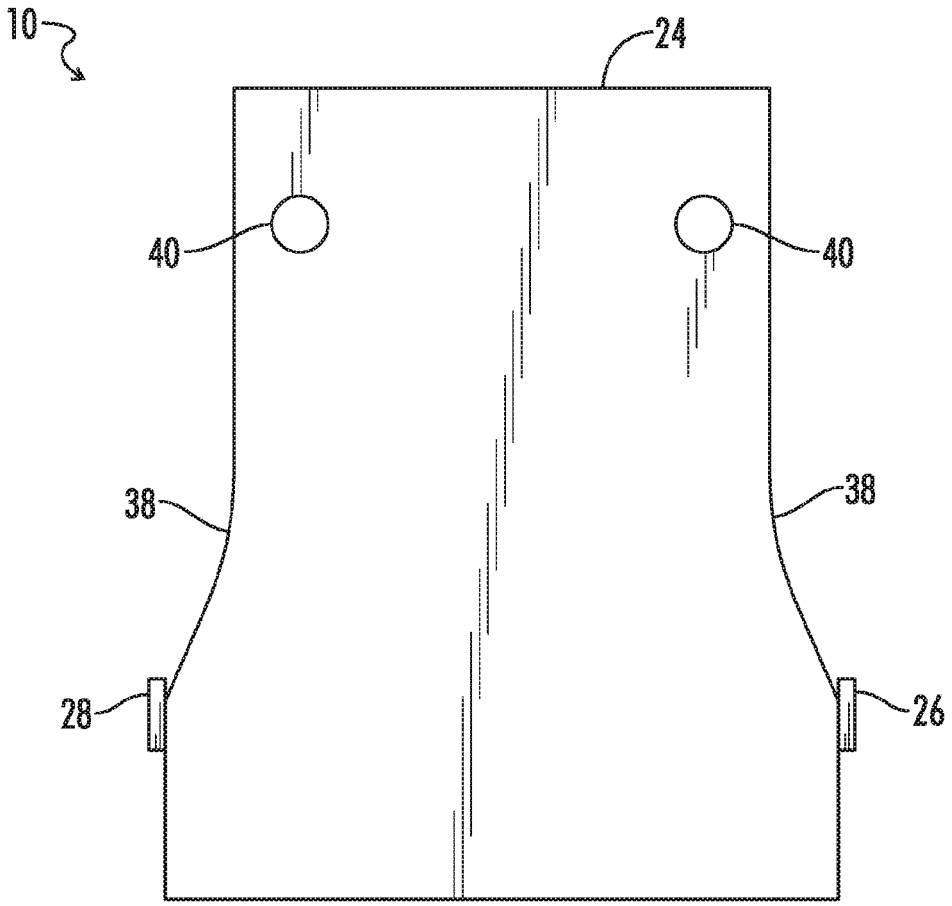
FIG. 6 is a front view of the attachment device shown in FIG. 5.
Figure 7:
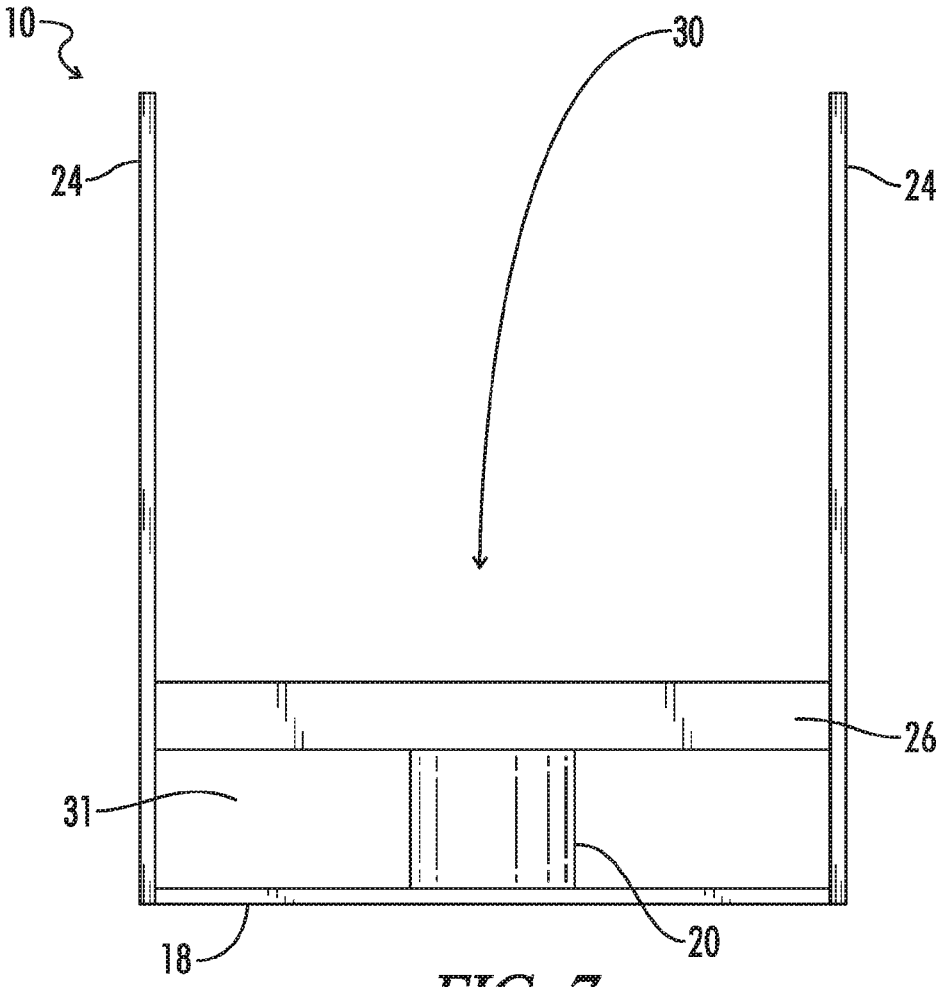
FIG. 7 is a side view of the attachment device shown in FIGS. 5-6.
Figure 8:
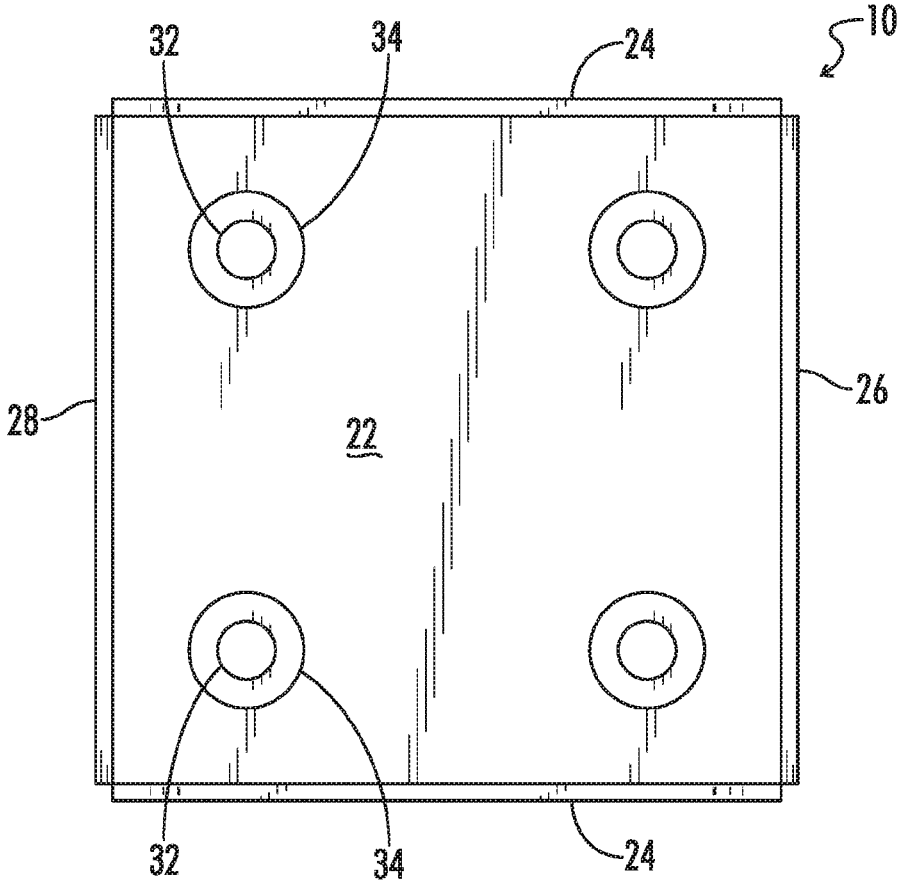
FIG. 8 is a top view of the attachment device shown in FIGS. 5-7.
Figure 9:
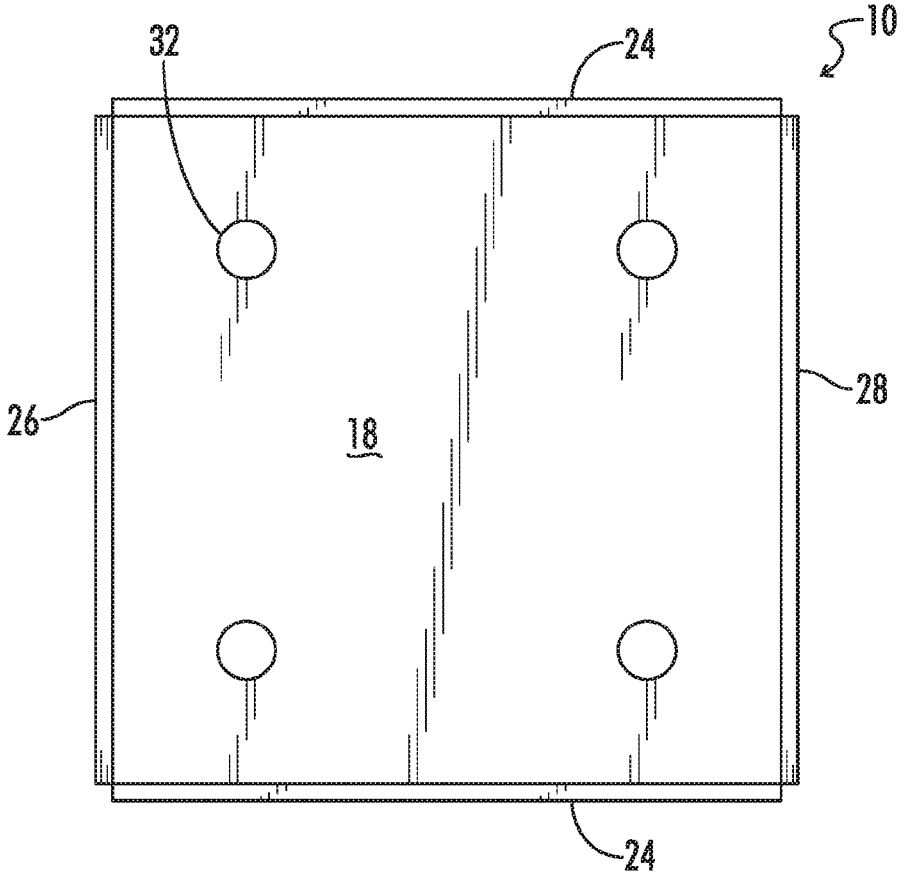
FIG. 9 is a bottom view of the attachment device shown in FIGS. 5-8.

Referring generally now to FIGS. 1-9, an anchoring device is shown and generally designated by the numeral 10.

The anchoring device 10, which can also be described as a support bracket 10 is for supporting a post 12. Preferably, the anchoring device connects a post 12 to a support surface 14 where that post can be any post known in the construction industry used to support other structures. For example, the post 12 can be used to support an upper structure 16, such as a roof or other element above the post 12. The support surface 14 can be any structure known in the construction industry. For example, the support surface 14 can be a concrete surface, a support pillar, a floor of a building, such as a dwelling, home, and the like. The anchoring device connects the post 12 and the support surface 14 and secures the post 12 through the anchoring device 10 to the support surface 14. Preferably, the anchoring device 10 connects a wooden post 12 to a concrete support surface 14.

The anchoring device 10 includes a base 18 and at least one stanchion 20 extending from the base. A plate 22 is attached to the stanchion 20 opposite the base 18. The stanchion 20 can be described as spacing the plate 22 from the base 18. A plurality of side supports 24 are included and extend from the base 18 towards the plate 22. Preferably, the side supports 24 extend past the plate 22 and are attached to the plate 22. First guide 26 and second guide 28 are attached to the plate 22 and extend away from the base 18. Preferably, the first and second guide 26 and 28 are also attached to each side support 24.

The plate 22, side supports 24, first guide 26, and second guide 28 define a cavity 30 that is shaped to accept the post 12. This facilitates attachment of the posts 12 into the anchoring device 10. Additionally, the side supports 24 can be biased inward towards each other, which can facilitate the securing of the post 12 in the anchoring device 10, and more particularly in the cavity 30. The stanchion 20 creates a gap 31 between the base 18 and plate 22 that facilitates movement of fluid such as water underneath the plate and lifts the post 12 away from this fluid thereby prolonging the life of the post 12. Additionally, this gap 31 also separates the post 12 from the support surface 14. This separation stops the post 12, especially when the post 14 is a wooden post, from absorbing or wicking moisture from the support surface 14. This restriction also helps to prolonging the life of the post 12.

In a preferred embodiment, the base 18 includes a plurality of base openings 32 while the plate 22 includes a plurality of plate openings 34. These openings facilitate the attachment of the anchoring device 10 to the support surface 14. For example, the base openings 32 allow the insertion of fasteners 36 from the support surface 14 that can secure the base 18 to the support surface 14, and in turn the anchoring device 10 to the support surface 14. For example, these fasteners can be nut and bolt type fasteners, threaded bars and nut, nails, or other fasteners as known in the art. The gap 31 along plate openings 34 can facilitate the attachment of these fasteners 36 by allowing access to the fasteners 36 both from a side approach in the gap 31 created between the base 18 and plate 22 and from the top through the plate openings 34. This is further facilitated by the preferred alignment of the plate openings 34 and the base openings 32.

Each side support 24 can include at least one curved side 38 and preferably two curved sides 38. The start up of the curvature of the curved side 38 can begin proximate the plate 22. Alternately, the curvature of the curved side 38 can begin proximate either the first guide 26 or second guide 28 depending upon the location of the curved side 38 of the particular side support 24.

The side supports 24 can further include a plurality of side support openings 40 that operate with fasteners 42 to secure the posts 12 to the side supports 24 and thus the anchoring device 10 to the posts 12. Preferably, the side support openings 40 on oppositely positioned side supports 24 are aligned. This further facilitates the use of fasteners 42 to secure the anchoring device 10 to the post 12. These fasteners 42 can be nut and bolt type fasteners, threaded bars and nut, nails, or other fasteners as known in the art to secure anchoring devices and posts.

The number of openings, including base openings 32, plate openings 34, and side support openings 40 can vary as desired. Preferably there are enough openings to properly secure the anchoring device 10 to both the post 12 and the support surface 14 without having too many of these openings to interfere with the actual structural integrity of the attaching device 10.

Thus, although there have been described particular embodiments of the present invention of a new and useful Anchor Device for a Wooden Post it is not intended that such references be construed as limitations upon the scope of this invention except as set forth in the following claims.

What is claimed is:

1. A method of supporting a support post in a generally upright position, the method comprising the steps of:

a) providing a bracket having a bracket length, a bracket width generally perpendicular to the bracket length and a bracket height generally perpendicular to the bracket length and bracket width, the bracket configured to support a support post in a generally upright position, the bracket comprising:

a base plate comprising a generally flat base plate bottom surface configured to rest on a support surface, a base plate top surface, a base plate height extending from the base plate top surface to the base plate bottom surface and generally parallel to the bracket height, a base plate length generally perpendicular to the base plate height, a base plate width generally perpendicular to the base plate length and base plate height, and a *plurality of* base plate fastener [aperture] *apertures extending through the base plate*, each *base plate fastener aperture* configured to receive a fastener to secure the base plate to the support surface;

*a horizontal plate located above the base plate and separated from the base plate by a gap, the horizontal plate comprising a horizontal plate bottom surface, a horizontal plate top surface, a horizontal plate height extending from the horizontal plate top surface to the horizontal plate bottom surface and generally parallel to the bracket height, a horizontal plate length generally perpendicular to the horizontal plate height, a horizontal plate width generally perpendicular to the horizontal plate height and horizontal plate length, and a plurality of plate openings extending through the horizontal plate, wherein each base plate fastener aperture is located directly below and aligned with each horizontal plate opening*;

a stanchion extending generally upward from the base plate and having a top end [terminating above the base plate top surface] *connected to the horizontal plate*, the stanchion having a stanchion height generally parallel to the bracket height and the base plate height;

a first side plate *connected to the horizontal plate and* extending generally upward from the base plate and having a first side plate top end located above the stanchion top end, the first side plate having a first side plate first fastener aperture located above the stanchion top end and below the first side plate top end; and a second side plate *connected to the horizontal plate and* extending generally upward from the base plate and having a second side plate top end located above the stanchion top end, the second side plate having a second side plate first fastener aperture located above the stanchion top end and below the second side plate top end,

*wherein the horizontal plate, the first side plate and the second side plate form a recess configured to support a support post in a generally upright position,* wherein the second side plate is opposite the first side plate, wherein the first side plate fastener aperture is configured to receive a fastener to secure a support post located in the recess to the first side plate, wherein the second side plate fastener aperture is configured to receive a fastener to secure a support post located in the recess to the second side plate, wherein the first and second side plates are separated by a space below the stanchion top end and above the base plate top surface and the stanchion does not fill the space[.]*;* b) placing the base plate bottom surface on a support surface;

c) [providing the support post] *inserting fasteners through the base plate fastener apertures to connect the base plate to the support surface*;

d) [placing a support post in a generally upright position between the first and second plate and above the stanchion top end] *placing the support post in a generally upright position in the recess so that the support post rests on the horizontal plate;* and e) securing the support post to the first and second side plates by placing a fastener through the support post, the first side plate first fastener aperture and the second side plate first fastener aperture.

2. The method of claim 1 wherein the stanchion is in the form of a cylinder, the stanchion further comprises a stanchion diameter perpendicular to the stanchion height, and wherein the stanchion diameter is greater than half of the lesser of the base plate length or width.

3. The method of claim 2 wherein the stanchion diameter is greater than three quarters of the lesser of the base plate length or width.

4. The method of claim 1 wherein the fastener aperture of the first *side* plate is aligned with the fastener aperture of the second *side* plate.

5. The method of claim 1 wherein the first side plate further comprises a first side plate second fastener aperture located above the stanchion top end and the second side plate further comprises a second side plate second fastener aperture located above the stanchion top end and step e) further comprises securing the support post to the first and second side plates by placing a fastener through the support post, the first side plate second fastener aperture and the second side plate second fastener aperture.

6. A method of supporting a support post in a generally upright position, the method comprising the steps of:

a) providing a bracket having a bracket length, a bracket width generally perpendicular to the bracket length and a bracket height generally perpendicular to the bracket length and bracket width, the bracket configured to support a support post in a generally upright position, the bracket comprising:

a base plate comprising a generally flat base plate bottom surface configured to rest on a support surface, a base plate top surface, a base plate height extending from the base plate top surface to the base plate bottom surface and generally parallel to the bracket height, a base plate length generally perpendicular to the base plate height, a base plate width generally perpendicular to the base plate length and base plate height, and a *plurality of* base plate fastener [aperture] *apertures extending through the base plate, each base plate fastener aperture* configured to receive a fastener to secure the base plate to the support surface;

a horizontal plate located above the base plate and separated from the base plate by a gap, the horizontal plate comprising a horizontal plate bottom surface, a horizontal plate top surface, a horizontal plate height extending from the horizontal plate top surface to the horizontal plate bottom surface and generally parallel to the bracket height, a horizontal plate length generally perpendicular to the horizontal plate height, and a horizontal plate width generally perpendicular to the horizontal plate height and horizontal plate length;

a stanchion extending generally upward from the base plate and having a top end [terminating below the horizontal plate top surface] *connected to the horizontal plate*, the stanchion having a stanchion height generally parallel to the bracket height, the base plate height, and the horizontal plate height;

a first side plate *connected to the horizontal plate and* extending generally upward from the base plate and having a first side plate top end located above the horizontal plate top surface, the first side plate having a first side plate fastener aperture located above the horizontal plate top surface and below the first side plate top end; and a second side plate *connected to the horizontal plate and* extending generally upward from the base plate and having a second side plate top end located above the horizontal plate top surface, the second side plate having a second side plate fastener aperture located above the horizontal plate top surface and below the second side plate top end, wherein the second side plate is opposite the first side plate, wherein the horizontal plate, the first side plate and the second side plate form a recess configured to support a support post in a generally upright position, the recess having a bottom defined by the horizontal plate and an open top, wherein the first side plate fastener aperture is configured to receive a fastener to secure a support post located in the recess to the first side plate, wherein the second side plate fastener aperture is configured to receive a fastener to secure a support post located in the recess to the second side plate, wherein the first and second side plates are separated by a space below the horizontal plate bottom surface and the stanchion does not fill the space, b) placing the base plate bottom surface on a support surface;

c) [providing the support post;] *inserting fasteners through the base plate fastener apertures to connect the base plate to the support surface;* d) placing the support post in a generally upright position in the recess so that the support *post* rests on the horizontal plate; and e) securing the support post to the first and second side plates by placing a fastener through the support post and the first and second side plate fastener apertures.

7. The method of claim 6 wherein the fastener aperture of the first *side* plate is aligned with the fastener aperture of the second *side* plate.

8. The method of claim 6 wherein the first side plate further comprises a first side plate second fastener aperture located above the horizontal plate top surface and the second side plate further comprises a second side plate second fastener aperture located above the horizontal plate top surface and step e) further comprises securing the support post to the first and second side plates by placing a fastener through the support post, the first side plate second fastener aperture and the second side plate second fastener aperture.

*9. The method of claim 1 wherein the horizontal plate openings are larger than the base plate fastener apertures.*

*10. The method of claim 1 wherein the bracket further comprises a first guide plate connected to the first and second side plates and the horizontal plate above the base plate, and a second guide plate opposite the first guide plate and connected to the first and second side plates and the horizontal plate above the base plate, and further wherein the first guide plate and the second guide plate also form the recess.*

*11. The method of claim 10 wherein the bracket comprises a rectangular front opening defined by the first side plate, the base plate, the second side plate and the first guide plate and a rectangular rear opening defined by the first side plate, the base plate, the second side plate and the second guide plate.*

*12. The method of claim 10 wherein the first and second guide plates are located above the base plate.*

*13. The method of claim 10 wherein each of the first side plate, second side plate, first guide plate and second guide plate comprise a top and further wherein the tops of the first and second side plates are located above the tops of the first and second guide plates.*

*14. The method of claim 1 wherein the first and second side plates are biased inwards toward each other to facilitate the securing of the support post in the recess.*

*15. The method of claim 6 wherein the bracket further comprises a first guide plate connected to the first and second side plates and the horizontal plate above the base plate, and a second guide plate opposite the first guide plate and connected to the first and second side plates and the horizontal plate above the base plate, and further wherein the first guide plate and the second guide plate also form the recess.*

*16. The method of claim 15 wherein the bracket comprises a rectangular front opening defined by the first side plate, the base plate, the second side plate and the first guide plate and a rectangular rear opening defined by the first side plate, the base plate, the second side plate and the second guide plate.*

*17. The method of claim 15 wherein the first and second guide plates are located above the base plate.*

*18. The method of claim 15 wherein each of the first side plate, second side plate, first guide plate and second guide plate comprise a top and further wherein the tops of the first and second side plates are located above the tops of the first and second guide plates.*

*19. The method of claim 6 wherein the first and second side plates are biased inwards toward each other to facilitate the securing of the support post in the recess.*

* * * * *